United States Patent [19]

Ichinose et al.

[11] Patent Number: 4,995,102
[45] Date of Patent: Feb. 19, 1991

[54] SCANNING METHOD USED BY LASER RADAR AND LASER RADAR FOR CARRYING OUT THE METHOD

[75] Inventors: Yuuji Ichinose, Hitachi; Fuminobu Takahashi, Katsuta; Yoshiaki Ichikawa, Hitachiota, all of Japan

[73] Assignee: Hitachi, Ltd., Tokyo, Japan

[21] Appl. No.: 192,179

[22] Filed: May 10, 1988

[30] Foreign Application Priority Data

May 13, 1987 [JP] Japan ................................. 62-114665

[51] Int. Cl.$^5$ ............................................. G01S 17/88
[52] U.S. Cl. ..................................... 342/158; 356/152
[58] Field of Search ..................... 250/203 R; 356/152, 356/141; 342/158, 73, 74, 78

[56] References Cited

U.S. PATENT DOCUMENTS

| | | | |
|---|---|---|---|
| 2,526,314 | 10/1950 | Alexanderson et al. | 342/158 |
| 2,556,673 | 6/1951 | Budenbom | 342/158 |
| 2,925,594 | 2/1960 | Garrett | 342/158 |
| 2,929,061 | 3/1960 | Dauguet | 342/78 |
| 3,124,797 | 3/1964 | Orear | 342/158 |

OTHER PUBLICATIONS

Vogel et al., "Lasers: Devices and Systems—Part III", Electronics, Nov. 1961, pp. 81–85.

Primary Examiner—Mark Hellner
Attorney, Agent, or Firm—Antonelli, Terry, Stout & Kraus

[57] ABSTRACT

A scanning method used by a laser radar for scanning a predetermined scanning region with a laser beam so that the whole of the scanning region is illuminated with the laser beam, is disclosed in which a laser beam makes a first spiral scanning outwardly or inwardly and then makes a second spiral scanning inwardly or outwardly so that the rotational direction of the second spiral scanning is the same as that of the first spiral scanning, and the first spiral scanning and the second spiral scanning are repeated. According to this scanning method, the output of drive means for driving an optical system which causes a laser beam to perform a scanning, can be reduced, since a maximum power necessary for causing a body large in inertia to make a curvilinear or rotational motion is far smaller than a maximum power necessary for causing the body to make a linear motion.

15 Claims, 6 Drawing Sheets

FIG. 1
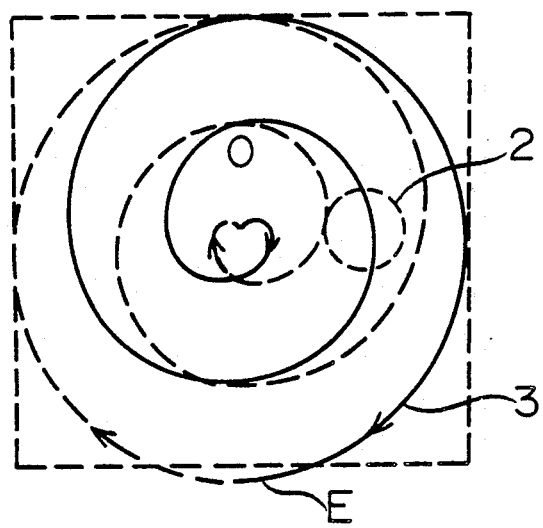
FIG. 2A        FIG. 2B
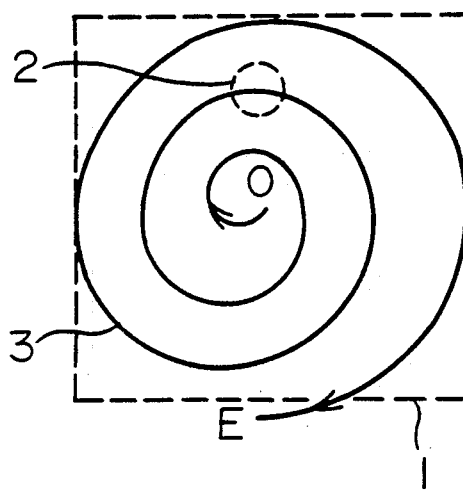 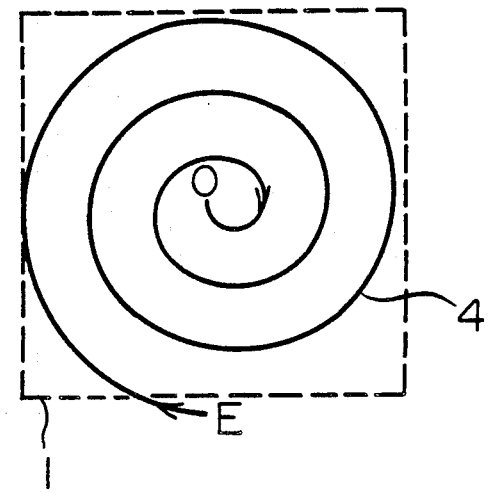
FIG. 3A        FIG. 3B
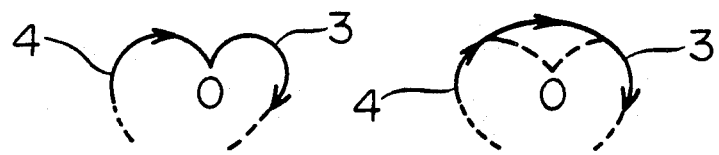

m = 1 m = 2 m = M

FIG. 11A
FIG. 11B
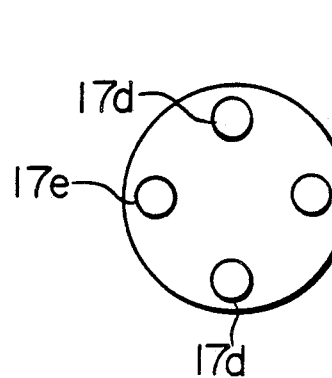
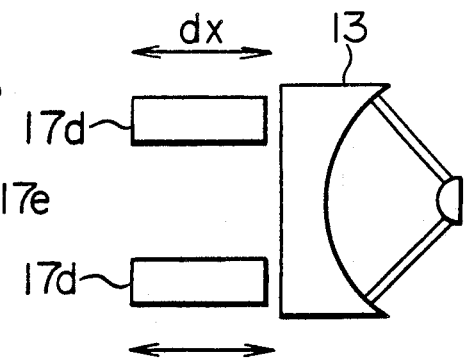
FIG. 12
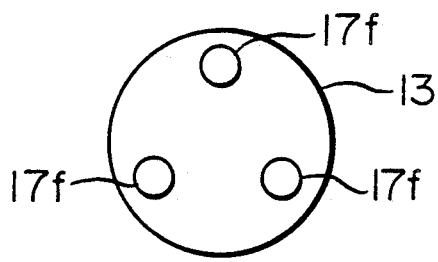
FIG. 13
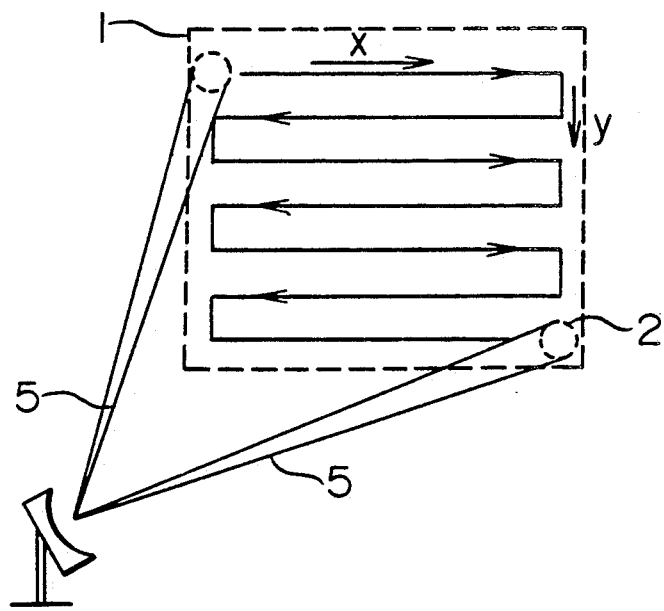

SCANNING METHOD USED BY LASER RADAR AND LASER RADAR FOR CARRYING OUT THE METHOD

BACKGROUND OF THE INVENTION

The present invention relates to a scanning method used by a laser radar for scanning a desired region with a laser beam to detect a target, and a laser radar for carrying out the scanning method.

In a conventional laser radar, as described in a Japanese patent application JP-A No. 57-125,371, a laser beam performs a raster scanning.

In a raster scan, as shown in FIG. 13, a laser beam 5 makes a linear scanning in a predetermined scanning region 1 in each of X- and Y-directions.

In a laser radar, it is required to make small the divergence angle of a laser beam, and thus an optical system for shaping and transmitting the laser beam is obliged to become large in size and weight. The above optical system is driven so that a desired region is scanned with the laser beam. In a case where the laser beam performs a raster scanning operation, a body large inertia is required to move linearly. Thus, there arises a problem that drive means such as X- and Y-scanners become large in size. The divergence angle ¼ of a laser beam is given by the following equation:

$$\tan\tfrac{1}{4} = 1.22\lambda/D \tag{1}$$

where D indicates the effective diameter of a lens, and λ the wavelength of the laser beam. For example, in order to make the angle ¼ equal to 10 μ rad in a case where the laser beam has a wavelength of 10.6 μm, it is necessary to make the effective diameter of the lens greater than about 1.3 m. When the lens is made of fuzed silica having a density $f$ of 2.2 g/cm³, the weight of the lens is in the order of 600 Kg. A maximum torque $T_{max}$ necessary for rotating the lens in a time $t_F$ equal to 100 ms through an angle $\theta_F$ equal to 0.1 rad by a bang-bang control, is given by the following equation:

$$\theta_F = \frac{1}{4J} T_{max} \cdot t_F^2 \tag{2}$$

where J indicates the moment of inertia of the lens.

When a disc having a diameter of 1.3 m and a thickness of 0.2 m is used as an approximation of the lens, the moment of inertia J is nearly equal to 60 Kgm². Thus, it is known from the equation (2) that the maximum torque $T_{max}$ is about 2400 Nm. From an equation T=D·F with respect to a rotational motion (where F indicates a drive force), it is known that the drive unit is required to have a maximum output $F_{max}$ equal to 1800 N.

In a radar using a microwave, as described in a Japanese patent application JP-A No. 51-85,392, a microwave beam makes a spiral scanning different from a raster scanning. In this case, however, the microwave beam makes the spiral scanning for the purpose of finding a target rapidly, and continues the outward spiral scanning till the target is found. That is, the repetition of the scanning for the same region is not taken into consideration. Further, in some cases, the spiral scanning is mixed with a linear scanning. That is, the above-mentioned problem of a laser radar has not been recognized.

SUMMARY OF THE INVENTION

An object of the present invention is to provide a scanning method used by a laser radar for reducing the output of drive unit which drives an optical system used for causing a laser beam to perform a scanning, and a laser radar for carrying out the scanning method.

In order to attain the above object, according to the present invention, when a predetermined scanning region is scanned with a laser beam so that the whole of the scanning region is illuminated with the laser beam, the laser beam makes a first spiral scanning outwardly or inwardly and then makes a second spiral scanning inwardly or outwardly so that the rotational direction of the second spiral scanning is the same as that of the first spiral scanning, and the first spiral scanning and the second spiral scanning are repeated.

Further, in a case where a scanning region of a laser radar is determined on the basis of information given by a microwave radar, also, the scanning region is scanned with a laser beam in the above-mentioned manner.

In a raster scanning operation, a scanning region is scanned only in one of X- and Y-directions for a predetermined time. That is, a scanning path is formed of straight lines. A maximum power required for causing a body large in inertia to make a linear motion, is larger than a maximum power required for causing the body to make a curvilinear or rotational motion. Accordingly, when a scanning region is scanned with a laser beam so that a scanning path always forms a spiral line, the output of drive unit can be reduced. Further, a drive unit for causing a laser beam to perform a raster scanning operation can also be used for causing the laser beam to perform a spiral scanning. In this case, the laser beam can make the spiral scanning only by changing the quantity of movement of the drive unit in each of X- and Y-directions.

BRIEF DESCRIPTION OF THE DRAWINGS

FIG. 1 is a schematic diagram for explaining a spiral scanning used in an embodiment of the present invention.

FIGS. 2A and 2B are schematic diagrams showing the first scanning and second spiral scanning of the scanning of FIG. 1, respectively.

FIGS. 3A and 3B are schematic diagrams showing two examples of the switchover of an inward spiral scanning to an outward spiral scanning at a central portion.

FIGS. 11A and 11B are diagrams showing another example of a scan drive apparatus.

FIG. 12 is a diagram showing a further example of a scan drive apparatus.

FIG. 13 is a schematic diagram for explaining a raster scanning which is performed by a conventional laser radar.

DESCRIPTION OF THE PREFERRED EMBODIMENT

An embodiment of the present invention will be explained below, with reference to the drawings.

FIG. 1 shows an example of a scanning operation according to the present invention. Referring to FIG. 1, a laser beam scans a scanning region 1 in such a manner that the laser beam moves from the center 0 of the scanning region 1 toward a point E existing outside of the region 1 so as to form a spiral scanning line 3 and then moves from the point E toward the center 0 so as to form a spiral scanning line 4 without changing the rotational direction of the spiral scanning line 3. It is to be noted that the spiral scanning path of the laser beam is determined from the thickness (that is, width) 2 of the laser beam so that the whole of the scanning region 1 can be illuminated with the laser beam. FIGS. 2A and 2B show the spiral scanning lines 3 and 4, respectively.

Figure 4:
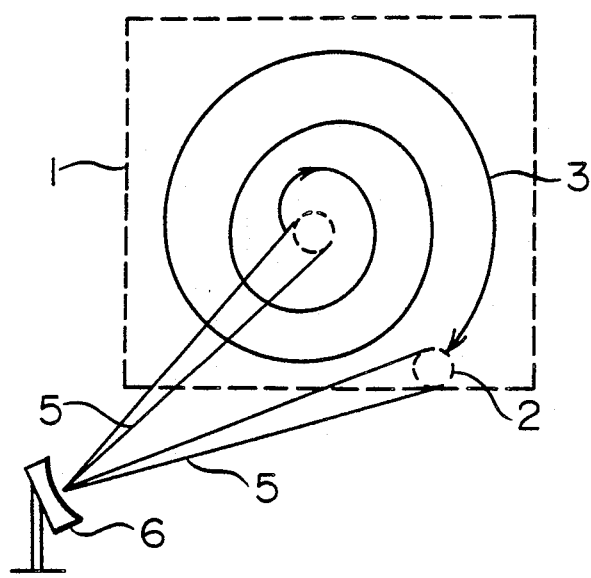
FIG. 4 is a schematic diagram showing a spiral scanning of a laser beam three-dimensionally.

FIGS. 3A and 3B show two examples of the switchover of the spiral scanning line 4 to the spiral scanning line 3. In the example of FIG. 3A, the switchover of the spiral scanning line 4 to the spiral scanning line 3 is discontinuous or nonsmooth. (However, the amount of movement of a scan drive apparatus required in the vicinity of the center 0 is very small, and hence the influence of the inertia of an optical system on the above movement is negligibly small.) Further, when a scanning is performed in the vicinity of the center 0 as shown in FIG. 3B, the spiral scanning line 4 can be connected to the spiral scanning line 3 in a continuous or smooth manner. FIG. 4 shows a spiral scanning for obtaining the scanning line 3, three-dimensionally. Referring to FIG. 4, a laser radar 6 transmits a laser beam 5 toward a spatial scanning region 1 so as to form a spiral scanning line 3. According to the present invention, such a scanning operation is repeatedly performed for a desired scanning region, that is, a series of scanning (for example, the scanning operation of FIG. 2A→the scanning operation of the FIG. 2B→the scanning of FIG. 2A→—and so on) are performed. The number of repeated scanning is determined from the detecting ability of the laser radar, and others.

Next, explanation will be made of the construction of a laser radar for carrying out a scanning method according to the present invention, with reference to FIG. 5.

Figure 5:
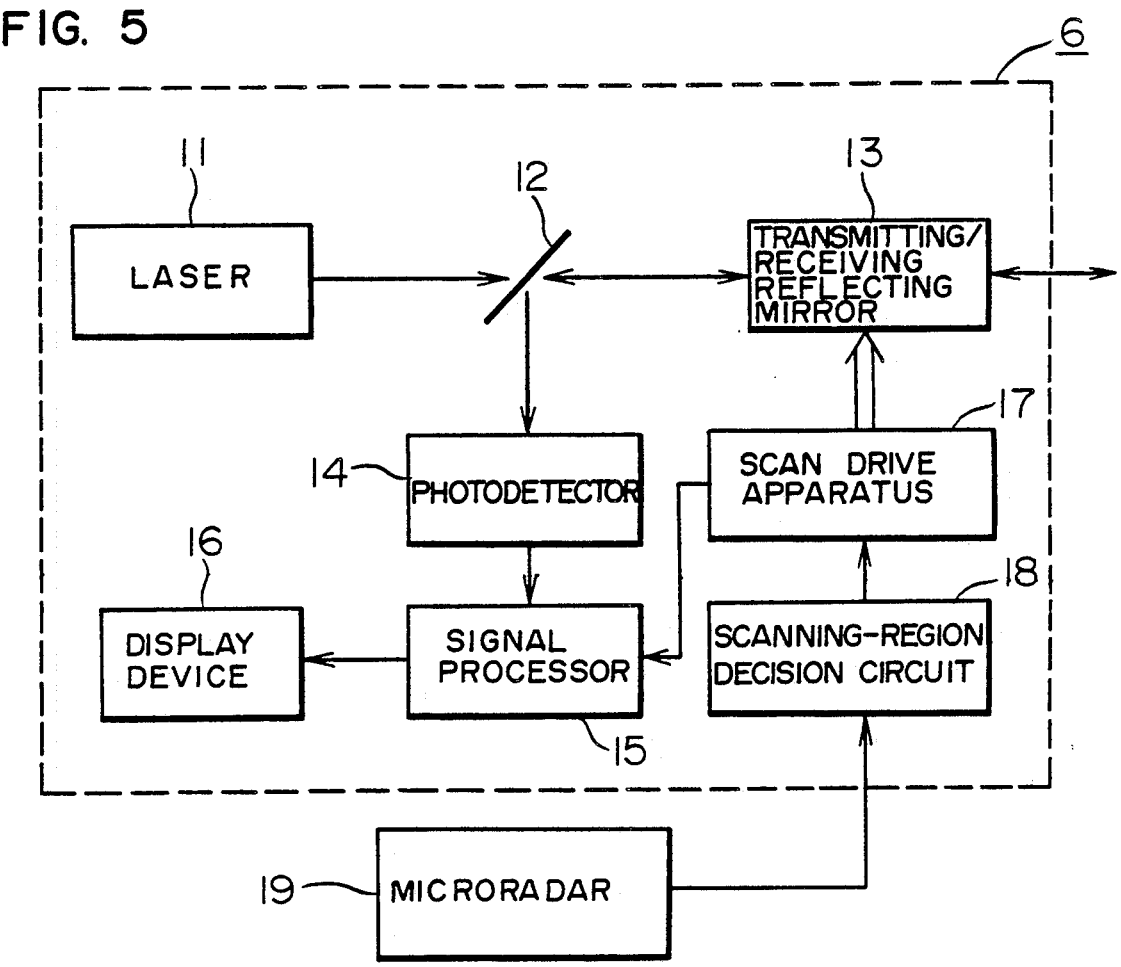
FIG. 5 is a block diagram showing an example of a laser radar for carrying out a scanning method according to the present invention.

In FIG. 5, reference numeral 11 designates a laser for emitting a laser beam, 12 a beam splitter, 13 a reflecting mirror for transmitting and receiving a laser beam, 14 a photodetector for detecting a laser beam reflected back from a target, 15 a signal processor, 16 a display device, 17 a scan drive apparatus, 18 a scanning-region decision circuit, and 19 a microwave radar. It is to be noted that both a transmitting optical system and a receiving optical system are constructed of the same reflecting mirror 13 for the sake of simplicity.

Figure 6:
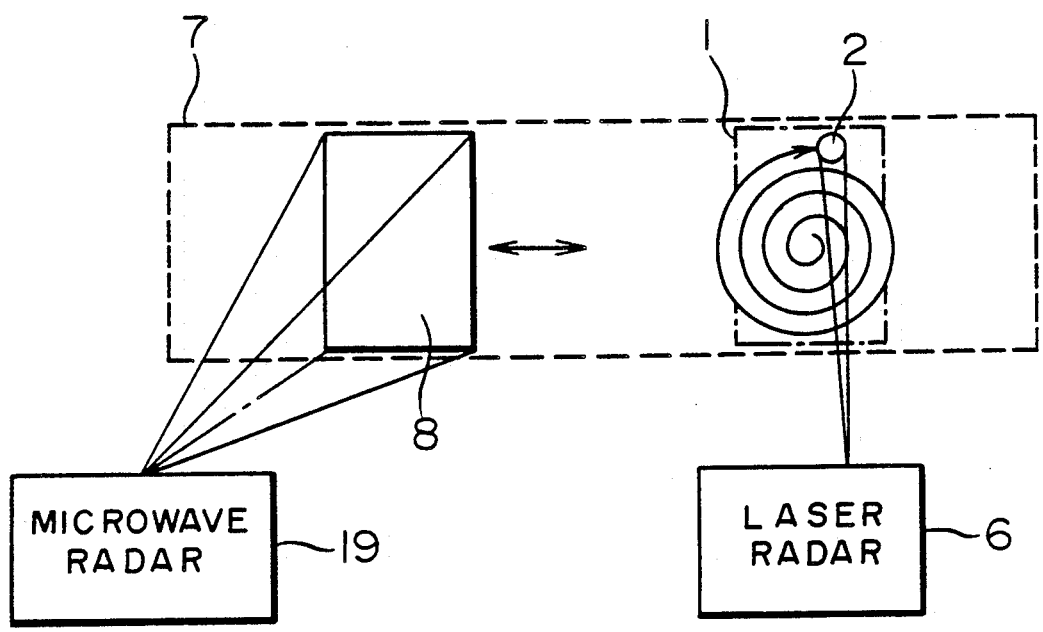
FIG. 6 is a schematic diagram for explaining a scanning which is performed by the laser radar of FIG. 5.

The laser radar having the above-mentioned construction is operated as follows. At first, the positional information on a target obtained by the microwave radar 19 is applied to the scanning-region decision circuit 18. In more detail, the microwave radar 19, as shown in FIG. 6, scans a scanning region 7 with a microwave beam 8 to find a target, and supplies the positional information on the target to the scanning-region decision circuit 18. The target exists in the microwave beam 8 at a time the microwave radar 19 detects the target. The microwave beam is thousands to ten thousands of times larger in wavelength $\lambda$ than the laser beam, and hence the width of the microwave beam proportional to $\lambda/D$ cannot be made small. Accordingly, the azimuthal resolution of the microwave radar is on the order of 1 to 5 degrees. Now, let us suppose that the azimuthal resolution of the microwave radar 19 is one degree. The scanning-region decision circuit 18 determines a scanning region 1 of the laser radar 6 as shown in FIG. 6, on the basis of the positional information on the target supplied from the microwave radar 19 and the azimuthal resolution thereof equal to one degree. In this case, a spatial region equal to the thickness of the microwave beam is used as the scanning region 1 of the laser radar 6, and the spiral scanning is started for the scanning region 1. In a case where the microwave radar 19 and the laser radar 6 are disposed at different positions and the positions are different in the inclination of the ground from each other, the information on the above positions and the inclination of the ground is used for determining the scanning region 1. As mentioned above, the position of the target is roughly determined by the microwave radar 19, and then a region thus determined is scanned with a laser beam 2 which is far thinner than the microwave beam 8, to detect the target rapidly and accurately.

Figure 7:
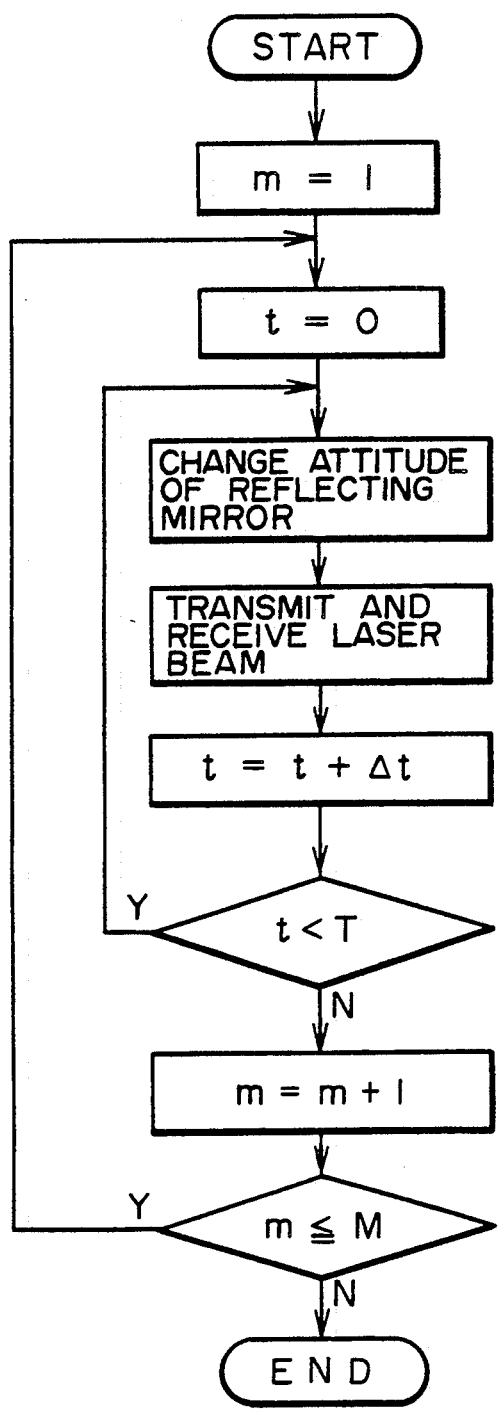
FIG. 7 is a flow chart showing the procedure of a spiral scanning used in an embodiment of the present invention.

When the scanning region 1 is determined, the laser radar 6 starts an operation for detecting the target. That is, a laser beam emitted from the laser 11 passed through the beam splitter 12, and is then focused by and sent out from the reflecting mirror 13. When the target is present in the traveling direction of the laser beam sent into the scanning region 1, the laser beam is reflected back from the target, and reaches the reflecting mirror 13. The laser beam from the reflecting mirror 13 is reflected from the beam splitter 12, and then received by the photodetector 14. The photodetector 14 converts the intensity of received light into an electrical signal, which is applied to the signal processor 15. The signal processor 15 carries out processing such as noise reduction and cluter noise rejection, to detect the target from the above electrical signal and the direction of transmitted laser beam obtained from the scan drive apparatus 17, and to display an image of the target on the display screen of the display device 16. Thus, the target can be detected from the displayed image. The above detecting operation is repeated while scanning the scanning region 1 with the laser beam 2. That is, the detecting operation is repeated as shown in the flow chart of FIG. 7. In FIG. 7, reference character M designates the number of repetitions of a scanning (it is to be noted that each of the outward spiral scanning 4 and the inward spiral scanning 3 is considered to be one scanning), and T a scanning time. At first, the repetition number m is set to 1 (one) and a time t is set to 0 (zero). The attitude of the reflecting mirror 13 is set so that the laser beam has a direction at a time t=0 which can be calculated from equations for expressing a spiral scanning. The equations will be explained later. In the above state, the laser beam is sent out, and it is checked whether or not the laser beam reflected from the target is detected. Next, the time t is set to t+Δt, and the above processing is repeated. When the time t becomes equal to the scanning time T, the whole of the scanning region 1 has been scanned with the laser beam, and thus one scanning operation terminates. Since the number of repetitions is M, the above scanning operation for the scanning region 1 is repeated M times.

Figure 8A:
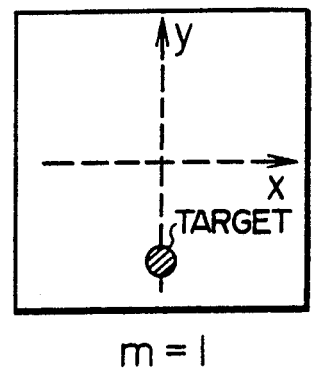
FIGS. 8A to 8C are schematic diagrams showing changes in position of a target detected by a series of scanning operations.
Figure 8B:
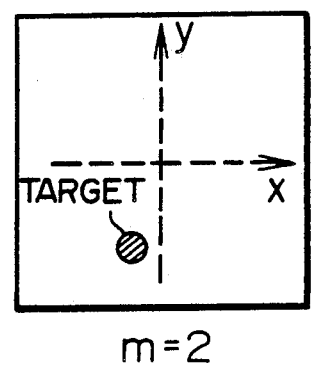
Figure 8C:
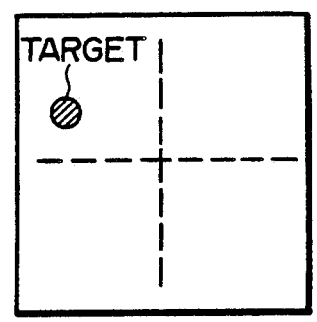

Each of FIGS. 8A to 8C shows the position of the target detected by a single scanning operation. For example, in a case where the target is moving, the position of the target detected by a single scanning operation varies as shown in FIGS. 8A to 8C. That is, by comparing the positional information on the target obtained by a scanning operation with the positional information obtained by another scanning operation, the shape and moving speed of the target can be determined.

Further, in a case where a body is moved in the scanning region or a plurality of bodies are present in the scanning region, the amount of movement of the body or the number of bodies can be detected from plural pieces of positional information obtained by a plurality of scanning operations.

Figure 9:
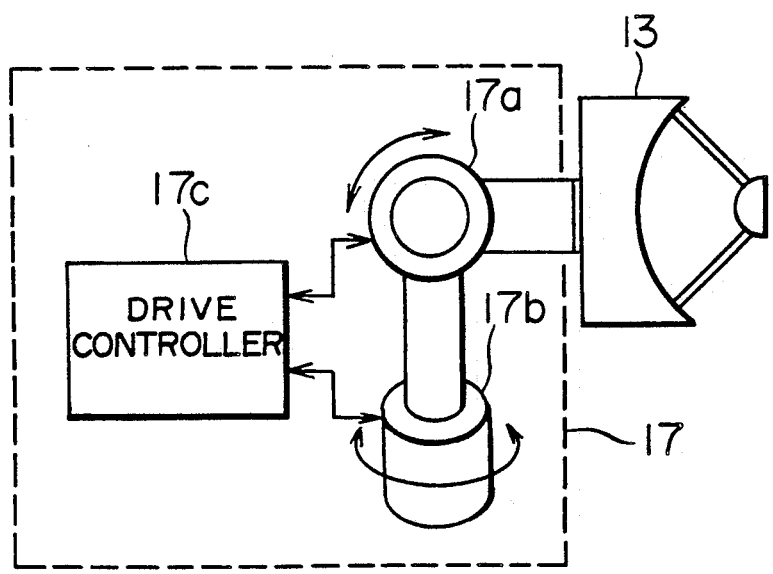
FIG. 9 is a diagram showing the construction of an example of a scan drive apparatus.

Next, the operation of the scan drive apparatus 17 will be explained. FIG. 9 shows an example of the scan drive apparatus 17. Referring to FIG. 9, a mechanism 17a drives the reflecting mirror 13 so as to change the angle of elevation thereof, and a mechanism 17b drives the reflecting mirror 13 so as to change the angle of azimuth thereof. Further, a drive controller 17c instructs each of the mechanisms 17a and 17b to move by an amount necessary for a laser beam to perform a spiral scanning operation as shown in FIG. 1.

Figure 10:
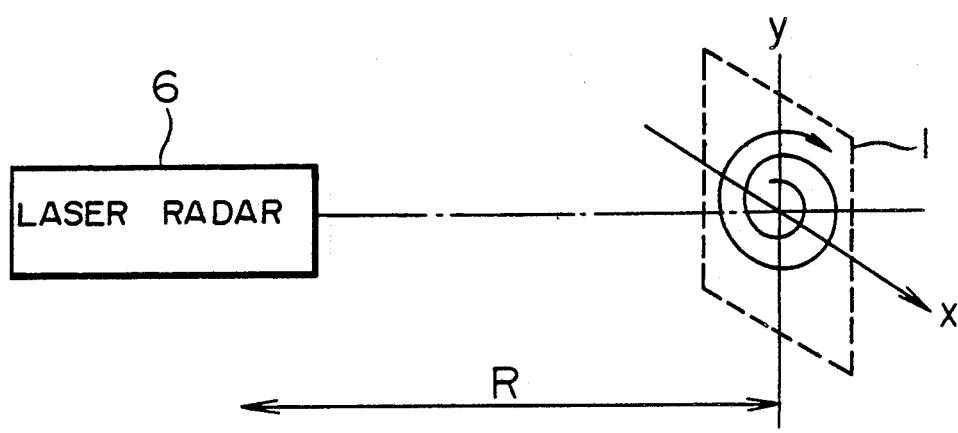
FIG. 10 is a diagram for explaining how the amount of movement of the scan drive apparatus of FIG. 9 is calculated.

Next, explanation will be made of the amount of movement of each of the mechanisms 17a and 17b required for performing a spiral scanning operation according to the present invention. Referring to FIG. 10, let us express the distance between the laser radar 6 and a scanning plane, an elevation direction and an azimuth direction by R, y and x, respectively. Then, a spiral scanning line on the scanning plane is given by the following equations:

$$X = \left(r_n - \frac{L}{2\pi} \omega t\right) \cos \omega t \quad (3)$$

$$Y = \left(r_n - \frac{L}{2\pi} \omega t\right) \sin \omega t \quad (4)$$

where $r_n = r - L \cdot n$ indicates a radius of the spiral scanning line, r a maximum radius of the spiral scanning line, n (=0, 1, 2, ... and so on) the order of spiral, L the width of the laser beam, and ω the angular frequency of the spiral scanning.

When the amount of movement of each of the mechanisms 17a and 17b specified by the drive controller 17c is given in the form of an angle of elevation $\theta_x$ or an angle of azimuth $\theta_y$, the angles $\theta_x$ and $\theta_y$ are indicated by the following equations:

$$\theta_x = \text{Tan}^{-1} \frac{X}{R} \quad (5)$$

-continued $$\theta_y = \text{Tan}^{-1} \frac{Y}{R} \quad (6)$$

In the above, explanation has been made of an example of the scan drive apparatus 17. Any apparatus capable of rotating the reflecting mirror 13 so as to change the angle of elevation and the angle of azimuth can be used as the scan drive apparatus 17. For example, when four oil hydraulic cylinders 17d and 17e are mounted on the reflecting mirror 13 as shown in FIGS. 11A and 11B, and the cylinders 17d and the cylinders 17e are used for changing the angle of azimuth and the angle of elevation, respectively, the reflecting mirror 13 can cause a laser beam to perform a spiral scanning. In this case, the difference $y_d$ in amount of movement between the cylinders 17d and the difference $x_d$ in amount of movement between the cylinders 17e are given by the following equations:

$$x_d = D \tan^{-1} \frac{X}{R} \quad (7)$$

$$y_d = D \tan^{-1} \frac{Y}{R} \quad (8)$$

where D indicates the diameter of the reflecting mirror 13.

In the above examples, the rotation of the reflecting mirror 13 for changing the angle of elevation and the rotation thereof for changing the angle azimuth are carried out independently of each other so that the laser beam performs a spiral scanning. Alternatively, three oil hydraulic cylinders 17f may be mounted on the reflecting mirror 13 as shown in FIG. 12. In this case, the rotation of the reflecting mirror 13 necessary for a laser beam to perform a spiral scanning is given by three cylinders 17f, and the movement of each cylinder 17f is determined by a combination of the quantities $X_d$ and $Y_d$ given by the equations (7) and (8).

In the above, explanation has been made of a case where an optical system is used as a transmitting optical system and a receiving optical system. The present invention is not limited to such a case, but is applicable to a laser radar which includes a transmitting optical system and a receiving optical system separately.

Further, in the above, explanation has been made of a case where the laser beam reflected back from a target is detected by the direct detection method. Alternatively, the reflected laser beam may be detected by the heterodyne detection method.

In the above, a reflecting mirror has been used as a scanning optical system. Alternatively, a curved mirror such as a spherical mirror, or a lens may be used as the scanning optical system.

Further, a laser beam has been used for scanning a desired region. However, an incoherent light beam may be used in place of the laser beam.

According to the present invention, when a predetermined scanning region is scanned with a laser beam so that the whole of the scanning region can be illuminated with the laser beam, the laser beam performs a spiral scanning operation, and hence the output of drive unit for driving an optical system which causes the laser beam to perform the scanning operation, can be made small.

In order to shown that the maximum output of a scan drive apparatus can be reduced by the present invention, a scanning method according to the present invention will be compared with a raster scanning method under the following conditions:

The moment of inertia J of a reflecting mirror for transmitting a laser beam is equal to 60 kgm$^2$, the divergence angle $\theta_d$ of the laser beam is 10 $\mu$ rad, a scanning region is given by a range of elevation angle $\theta_{ys}$ from $+1,000$ $\mu$ rad to $-1,000$ $\mu$ rad and a range of azimuth angle $\theta_{xs}$ from $+1,000$ $\mu$ rad to $-1,000$ $\mu$ rad, and a total scanning time is 1 sec.

The raster scanning method

A change $\Delta\theta_y$ in scanning angle of elevation equal to 20 $\mu$ rad and a change $\Delta\theta_x$ in scanning angle of azimuth equal to 2,000 $\mu$ rad are repeated one hundred times to scan the predetermined scanning region with a laser beam. Now, let us suppose that the raster scanning operation is performed by the bang-bang control. Then, from the equation (2), we can obtain the following equation:

$$2\sqrt{\frac{J}{T_{max}}} \times (\sqrt{\Delta\theta_x} + \sqrt{\Delta\theta_y}) = T/100 \tag{9}$$

From the equation (9), we can obtain the maximum torque $T_{max}$ as follows:

$$T_{max} = 5808 \ Nm$$

The scanning method according to the present invention

In a spiral scanning operation, an angle of elevation $\theta_y$ and an angle of azimuth $\theta_x$ are given by the following equations:

$$\theta_x = \left(r_n - \theta_d \frac{\omega_n t}{2\pi}\right)\cos \omega t \tag{10}$$

$$\theta_y = \left(r_n - \theta_d \frac{\omega_n t}{2\pi}\right)\sin \omega t \tag{11}$$

where $r_n$ is equal to $(100\theta_d - 2\theta_{d \cdot n})$, and n indicates an order of spiral.

Now, let us differentiate the equation (10) with respect to t to obtain an angular acceleration. Then, we can obtain the following equation:

$$\frac{d^2\theta_x}{dt^2} = -\left(r_n - \frac{\theta_d}{2\pi}\omega_n t\right)\omega_n^2 \cos\omega_n t + \frac{\theta_d}{2\pi}\omega_n^2 \sin\omega_n t \tag{12}$$

Let us use the following approximation for a maximum angular acceleration:

$$a_{max} = \left(\frac{d^2\theta_x}{dt^2}\right)_{max} = r_n\omega_n^2 \tag{13}$$

A time $t_n$ necessary for a laser beam to move on a spiral scanning path by an angle of 360° is given by the following equation:

$$t_n = \frac{2\pi}{\omega_n} = 2\pi\sqrt{\frac{r_n}{a_{max}}} \tag{14}$$

The total scanning time T equal to 1 sec. is given as follows:

$$T = \frac{2\pi}{\sqrt{a_{max}}}(\sqrt{r_0} + \sqrt{r_1} + \ldots + \sqrt{r_{49}}) \tag{15}$$

The equation (15) can be rewritten as follows:

$$1 = \frac{2\pi}{\sqrt{a_{max}}} \times 1.098$$

Thus, the maximum angular acceleration $a_{max}$ is equal to 7.57.

The maximum torque $T_{max}$ is given by an equation $T_{max} = J \cdot a_{max}$, and the moment of inertia J of the reflecting mirror is equal to 60 Kgm$^2$. Accordingly, the maximum torque $T_{max}$ is equal to 454.5 Nm.

As has been already mentioned, the raster scanning method requires a maximum torque $T_{max}$ equal to 5,808 Nm. Hence, the maximum torque required for the spiral scanning is less than one-tenth the maximum torque required for the raster scanning. When an electric motor is used as a drive source, a motor current is proportional to the torque required. When the maximum torque is made less than one-tenth a conventional value, the motor can be made small in size. That is according to the present invention, the output of a drive source can be reduced, and the drive source can be made small in size.

We claim:

1. A scanning method used by a laser radar for scanning a predetermined scanning region with a laser beam to detect a target, the scanning method comprising the steps of:
    scanning a scanning region with a laser beam so that a spiral scanning path is outwardly formed, and then scanning the scanning region with the laser beam so that a spiral scanning path is inwardly formed; and
    repeating the outward and inward spiral scanning while effecting smooth switchover at a switchover point from the inward spiral scanning to the outward spiral scanning.

2. A scanning method used by a laser radar for scanning a predetermined scanning region with a laser beam to detect a target, the scanning method comprising the steps of:
    scanning a scanning region with a laser beam so that a spiral scanning path is outwardly formed, and then scanning the scanning region with the laser beam so that a spiral scanning path is inwardly formed; and
    repeating the outward and inward spiral scanning;
    wherein the scanning region scanned with the laser beam is determined on the basis of the positional information on a target obtained by a microwave radar.

3. A scanning method used by a laser radar for scanning a predetermined scanning region with a laser beam to detect a target, the scanning method comprising the steps of:

scanning a scanning region with a laser beam so that a spiral scanning path is inwardly formed, and then scanning the scanning region with the laser beam so that a spiral scanning path is outwardly formed while effecting smooth switchover at a switchover point at least from the inward spiral scanning to the outward spiral scanning; and repeating the inward and outward spiral scanning operations.

4. A scanning method used by a laser radar for scanning a predetermined scanning region with a laser beam to detect a target, the scanning method comprising the steps of:

scanning a scanning region with a laser beam so that a spiral scanning path is inwardly formed, and then scanning the scanning region with the laser beam so that a spiral scanning path is outwardly formed; and wherein the scanning region scanned with the laser beam is determined on the basis of the positional information on a target obtained by a microwave radar.

5. A laser radar comprising:

a laser;

transmitting means for focusing a laser beam emitted from the laser to transmit the laser beam;

a scan drive apparatus for driving the transmitting means, the scan drive apparatus being made up of a drive portion for changing the angle of elevation and the angle of azimuth of the transmitting means and a drive controller, the drive portion being controlled by the drive controller so that the laser beam performs an inward spiral scanning and an outward spiral scanning operation continuously and repeatedly in a predetermined scanning region;

means for receiving a laser beam reflected from a target;

a photodetector for detecting the laser beam received by the receiving means and for delivering an electrical signal corresponding to the intensity of received laser beam;

a signal processor for recognition of the target, on the basis of information obtained from the photo-detector and information on the direction of the laser beam transmitted from the transmitting means, the information on the direction of the transmitted laser beam being obtained from the scan drive apparatus; and means for expressing the result of processing carried out by the signal processor.

6. A laser radar comprising:

a laser;

transmitting means for focusing a laser beam emitted from the laser to transmit the laser beam;

a scan drive apparatus for driving the transmitting means, the scan drive apparatus being made up of a drive portion for changing the angle of elevation and the angle of azimuth of the transmitting means and a drive controller, the drive portion being controlled by the drive controller so that the laser beam performs an inward spiral scanning and an outward spiral scanning operation continuously and repeatedly in a predetermined scanning region;

means for receiving a laser beam reflected from a target;

a photodetector for detecting the laser beam received by the receiving means and for delivering an electrical signal corresponding to the intensity of received laser beam;

a signal processor for recognition of the target on the basis of information obtained from the photodetector and information on the direction of the laser beam transmitted from the transmitting means, the information on the direction of the transmitted laser beam being obtained from the scan drive apparatus; and means for expressing the result of processing carried out by the signal processor;

wherein the scanning region scanned with the laser beam is determined on the basis of the positional information on the target obtained by a microwave radar.

7. A scanning method according to claim 1, further comprising the step of scanning with a microwave radar to detect the position of the target, and determining the scanning region of the laser radar in accordance with the position of the target detected by the microwave radar.

8. A scanning method according to claim 3, further comprising the step of scanning with a microwave radar to detect the position of the target, and determining the scanning region of the laser radar in accordance with the position of the target detected by the microwave radar.

9. A laser radar according to claim 5, further comprising a microwave radar for detecting the position of the target, and means for determining the scanning region scanned with the laser beam of the laser radar in accordance with the position of the target detected by the microwave radar.

10. A laser radar according to claim 5, wherein the scan drive apparatus comprises at least one oil cylinder for driving the transmitting means.

11. A method of scanning a laser radar with reduced power requirements for a drive of the laser radar so as to enable scanning a predetermined scanning region with a laser beam to detect a target, the scanning method comprising the steps of:

scanning a scanning region with a laser beam by operating a drive of the laser radar so that a spiral scanning path is one of outwardly formed and inwardly formed, and then scanning the scanning region with the laser beam so that a spiral scanning path is the other of inwardly and outwardly formed while effecting smooth switchover at a switchover point at least from the inward spiral scanning to the outward spiral scanning; and repeating the one of outward and inward and the other of inward and outward spiral scanning;

whereby the drive for driving the laser radar o effect the spiral scanning path has reduced power requirements with respect to a drive for driving the laser radar over a linear scan path for scanning the region.

12. A method according to claim 11, further comprising the step of scanning with a microwave radar to detect the position of the target, and determining the scanning region of the laser radar in accordance with the position of the target detected by the microwave radar.

13. A laser comprising:

a laser;

transmitting means for focusing a laser beam emitted from the laser to transmit the laser beam;

scan drive means for driving the transmitting means so that the laser beam effects a spiral scanning along one of an outwardly formed and inwardly formed spiral scanning path of a scanning region and then scans the scanning region along the other of an inwardly and outwardly formed spiral scanning path in a repetitive manner so that the drive means driving the transmitting means of the laser beam to effect the spiral scanning path has reduced power requirements with respect to a drive for driving the transmitting means over a linear scan path for scanning the region; and means for receiving a laser beam reflected from a target;

wherein the scanning means drives the transmitting means so as to effect smooth switchover at a switchover point at least from the inwardly spiral scanning to the outwardly spiral scanning.

14. A laser radar comprising:

a laser;

transmitting means for focusing a laser beam emitted from the laser to transmit the laser beam;

scan drive means for driving the transmitting means so that the laser beam effects a spiral scanning along one of an outwardly formed and inwardly formed spiral scanning path of a scanning region and then scans the scanning region along the other of an inwardly and outwardly formed spiral scanning path in a repetitive manner so that the drive means driving the transmitting means of the laser beam to effect the spiral scanning path has reduced power requirements with respect to a drive for driving the transmitting means over a linear scan path for scanning the region;

means for receiving a laser beam reflected from a target;

a microwave radar for detecting the position of the target; and means for determining the scanning region scanned with the laser beam of the laser radar in accordance with the position of the target detected by the microwave radar.

15. A laser radar according to claim 14, wherein the scan drive means includes at least one oil cylinder for driving the transmitting means.

* * * * *